(12) United States Patent
Barrios (10) Patent No.: US 8,721,231 B2
(45) Date of Patent: May 13, 2014

(54) DEADLOCK ALLEVIATION FOR PNEUMATIC TUBE SYSTEMS

(75) Inventor: Pedro Barrios, Elkhorn, WI (US)

(73) Assignee: Swisslog Healthcare Solutions, Denver, CO (US)

( * ) Notice: Subject to any disclaimer, the term of this patent is extended or adjusted under 35 U.S.C. 154(b) by 603 days.

(21) Appl. No.: 13/025,411

(22) Filed: Feb. 11, 2011

(65) Prior Publication Data

US 2012/0051849 A1 Mar. 1, 2012

Related U.S. Application Data (60) Provisional application No. 61/376,823, filed on Aug. 25, 2010.

(51) Int. Cl.
*B65G 53/00* (2006.01)

(52) U.S. Cl.
USPC .............. 406/197; 406/11; 700/229; 700/230

(58) Field of Classification Search
USPC .............................. 406/11, 197; 700/229, 230
See application file for complete search history.

(56) References Cited

U.S. PATENT DOCUMENTS

| | | | |
|---|---|---|---|
| 2,679,990 A | 6/1954 | Mathzeit et al. | |
| 2,710,728 A | 6/1955 | Halpern | |
| 2,893,660 A | 7/1959 | Cook et al. | |
| 3,236,475 A | 2/1966 | Mach et al. | |
| 3,627,231 A | 12/1971 | Kalthoff | |
| 3,817,476 A | 6/1974 | Martin | |
| 3,951,461 A | 4/1976 | De Feudis | |
| 4,058,274 A | 11/1977 | Hochradel et al. | |
| 4,336,589 A * | 6/1982 | Smith et al. | ...................... 705/28 |
| 4,354,775 A | 10/1982 | Jalas | |
| 4,563,112 A | 1/1986 | Mokuya et al. | |
| 4,630,216 A | 12/1986 | Tyler et al. | |
| 4,766,547 A | 8/1988 | Modery et al. | |
| 4,829,445 A * | 5/1989 | Burney | ......................... 700/230 |
| 5,038,290 A | 8/1991 | Minami | |
| 5,165,826 A | 11/1992 | Egbert | |
| 5,217,328 A | 6/1993 | Lang | |
| 5,234,292 A | 8/1993 | Lang | |
| 5,237,931 A | 8/1993 | Riedl | |
| 5,267,173 A | 11/1993 | Tanizawa et al. | |
| 5,375,691 A | 12/1994 | Wirtz | |
| 5,562,367 A | 10/1996 | Scott | |
| 5,682,820 A | 11/1997 | Arata | |
| 5,805,454 A | 9/1998 | Valerino, Sr. et al. | |
| 5,864,485 A | 1/1999 | Hawthorne et al. | |
| 5,896,297 A | 4/1999 | Valerino, Sr. | |
| 6,048,086 A | 4/2000 | Valerino, Sr. | |
| 6,169,936 B1 * | 1/2001 | Lohmann | ....................... 700/224 |
| 6,173,212 B1 | 1/2001 | Valerino, Sr. | |
| 6,202,004 B1 | 3/2001 | Valerino, Sr. | |
| 6,477,442 B1 | 11/2002 | Valerino, Sr. | |
| 6,712,561 B1 | 3/2004 | Valerino, Sr. et al. | |
| 6,775,582 B2 * | 8/2004 | Schaaf et al. | .................. 700/116 |

(Continued)

*Primary Examiner* — Joseph Dillon, Jr.
(74) *Attorney, Agent, or Firm* — Russell T. Manning; Marsh Fischmann & Breyfogle LLP (57) ABSTRACT

Provided herein is a system and method for alleviating gridlock in a pneumatic tube system. In various instances where inter-zone transactions conflict, one of the transactions is removed from a conflicting set and temporarily delivered to an alternate location in the system. This allows other blocked transactions to proceed. Once the gridlock condition is alleviated, the temporarily delivered carrier is retrieved and rerouted to its intended destination.

8 Claims, 8 Drawing Sheets

(56) References Cited

U.S. PATENT DOCUMENTS

| | | |
|---|---|---|
| 7,243,002 B1 | 7/2007 | Hoganson et al. |
| 7,326,005 B1 | 2/2008 | Castro et al. |
| 7,328,084 B1 | 2/2008 | Hoganson et al. |
| 7,363,106 B1 | 4/2008 | Hoganson et al. |
| 7,424,340 B2 | 9/2008 | Owens |
| 7,653,457 B2 * | 1/2010 | Bloom .......................... 700/226 |
| 7,751,930 B2 | 7/2010 | Valerino, Sr. |
| 2001/0056311 A1 * | 12/2001 | Valerino, Sr. ................. 700/214 |
| 2002/0116085 A1 * | 8/2002 | Schaaf et al. ................. 700/115 |
| 2005/0273196 A1 * | 12/2005 | Valerino ....................... 700/230 |
| 2008/0243301 A1 * | 10/2008 | Lanigan et al. ............... 700/214 |
| 2009/0003985 A1 * | 1/2009 | Lanigan et al. ............... 414/814 |
| 2009/0299521 A1 * | 12/2009 | Hansl et al. .................. 700/215 |
| 2010/0094451 A1 * | 4/2010 | Hoganson et al. ........... 700/228 |
| 2010/0318216 A1 * | 12/2010 | Faivre et al. ................. 700/218 |
| 2011/0270438 A1 * | 11/2011 | Shimamura ................... 700/214 |

* cited by examiner

DEADLOCK ALLEVIATION FOR PNEUMATIC TUBE SYSTEMS

CROSS REFERENCE

This application claim the benefit of the filing date of U.S. Provisional Application No. 61/376,823 entitled: "Deadlock Alleviation for Pneumatic Tube Systems" and having a filing date of Aug. 25, 2010, the entire contents of which is incorporated by reference herein.

FIELD

The presented disclosure relates generally to pneumatic tube carrier systems. More specifically, the disclosure provides systems, apparatuses, and methods for identifying and alleviating deadlock conditions.

BACKGROUND

Pneumatic tube carrier systems are a well-known means for the automated transport of materials between, for example, an origination location and any one of a plurality of destination locations. A typical system includes a number of pneumatic tubes interconnected in a network to transport carriers between user stations. Various blowers and transfer units provide the force and path control means, respectively, for moving the carriers through and from tube-to-tube within the network. Generally, transfer units move or divert pneumatic carries from a first pneumatic tube to a second pneumatic tube in order to route the pneumatic carrier between locations, or stations, in the network.

The pneumatic tubes forming the network of a pneumatic tube system may be arranged in any manner that allows the carriers to be transferred between various stations. Generally, systems include a number of individual stations interconnected to the network by a single pneumatic tube. The single pneumatic tube transfers carriers to and from the station under pressure and vacuum.

Large pneumatic tube systems often require a complex network of interconnected tubes. Further, to provide functionality to separate portions of such large systems, most such systems are divided into multiple zones. Typically, each zone includes a set of stations that receive pneumatic pressure and/or vacuum from a common blower. For instance, a transfer unit that receives pressure and/or vacuum from the common blower may connect to each station of such a zone. This transfer unit permits carriers received from a tube connected to one of the stations to be transferred to a tube connected to another of the stations. However, effective use of the pneumatic tube system requires connecting different zones to permit inter-zone traffic (i.e., transfers from zone to zone). Such inter-zone connections are sometimes made using dedicated unidirectional tubes. In such instances, a zone may interconnect directly to one or more adjacent zones. Accordingly, to effect transfer of a carrier from a sending station to a receiving station may require passing a carrier through more than one zone and/or multiple inter-zone connections.

In order to enhance the functionality of a pneumatic tube system, such systems concurrently process multiple carriers. However, when inter-zone paths of two or more carriers conflict, a gridlock or deadlock condition may occur, which does not permit these carriers to proceed. One solution for alleviating gridlock situations in pneumatic carrier systems is to include at least one bypass pipe to which one carrier may be moved within a particular zone while another transaction passes through the zone. Such bypass typically requires recalling one carrier from an inter-zone connection (e.g., transfer tube) and locating/parking that carrier in a bypass tube to permit a blocked carrier to pass by the parked carrier and enter the now vacated inter-zone transfer tube.

SUMMARY

Presented herein are systems, methods and apparatus (i.e., utilities) for use in alleviating gridlock conditions that may arise in a pneumatic tube system. In various arrangements, the presented utilities permit the resolution of gridlock situations in high volume transfer situations as well as in situations where it is not possible to recall a carrier from a current location.

Various aspects of the presented inventions are embodied in a pneumatic carrier system which includes stations, zones, inter-zones, and pneumatic sources. The movement of various carriers within the system is regulated by a control system which includes digital processing capability. The control system has the capability of recognizing gridlock situations and taking action to rectify such gridlock situations. The control system also has the capability to control the pneumatic operation of the system, thus causing the carriers in the system to move through the system in accordance with control signals generated by the control system. Such control may entail removal of one or more carriers from a gridlock situation for the temporary delivery to locations not originally included in an intended route path of a carrier. In various embodiments, a carrier involved in inter-zone gridlock may be temporarily routed to a location within an intervening PV zone. Such an intervening PV zone may include multiple user stations and/ or other pneumatic system components that may temporarily house a carrier. In this regard, multiple parking spaces may be available in existing systems that may be utilized to alleviate gridlock conditions.

In a first aspect, a utility is provided for utilizing a user station or other temporary storage location to alleviate a circular gridlock condition in a pneumatic carrier system. The utility includes identifying a set of three or more interdependent carrier transactions where an immediate destination of the carriers associated with each carrier transaction is currently occupied by a carrier of another one of the set of carrier transactions. Upon such identification, control signals are generated that are operative to temporarily deliver a first carrier of the set of gridlock carriers to a location in a PV zone such as above a user station. Once one of the carriers is removed from the circular gridlock set of carriers, the remaining carriers are cyclically advanced. That is, one carrier advances into a position previously occupied by the removed carrier and another carrier moves into the spot vacated by the previously advanced carrier. Once all the carriers have been advanced, the temporarily delivered carrier is automatically retrieved from its location in the PV zone and re-launched and into the system for delivery.

BRIEF DESCRIPTION OF THE DRAWINGS

For a more complete understanding of the present disclosure and further advantages thereof, reference is now made to the following detailed description taken in conjunction with the drawings in which.

DETAILED DESCRIPTION

Reference will now be made to the accompanying drawings, which at least assist in illustrating the various pertinent features of the presented inventions. In this regard, the following description is presented for purposes of illustration and description. Furthermore, the description is not intended to limit the disclosed embodiments of the inventions to the forms disclosed herein. Consequently, variations and modifications commensurate with the following teachings, and skill and knowledge of the relevant art, are within the scope of the presented inventions.

Figure 1:
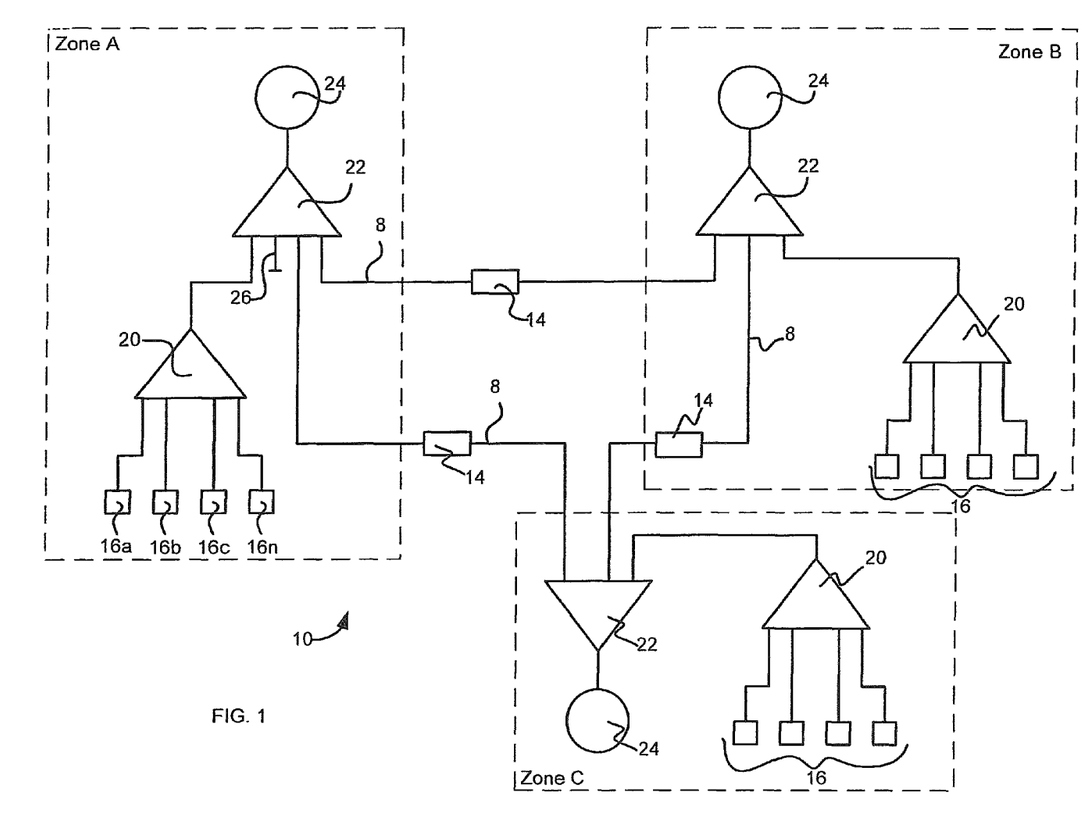
FIG. 1 illustrates one embodiment of a pneumatic tube system.

Disclosed in FIG. 1 is a system diagram for a pneumatic carrier system 10. In general, the pneumatic carrier system 10 transports pneumatic carriers between various user stations 16a-n, each such transport operation being referred to herein as a "transaction". A transaction is the object used by a control system of the pneumatic tube system to represent a physical carrier in the system, and it includes transaction information associated with the transaction. The transaction information is used by the control system in controlling the flow of transactions. For each transaction, the transaction information includes an initial source, an ultimate/final destination, a present source, and an immediate destination. Transaction information also includes a unique identifier, such as a number and/or carrier identification, associated with every transaction, and an assigned priority, which is initially derived from the sum of the send priority of the source station and the receive priority of the destination station. The priority of a transaction may be changed in the course of movement of the carrier associated with the transaction through the system. Such transaction information may be stored to transaction records in the system archive.

At each of the user stations 16a-n, a user may insert a carrier, select/enter a destination address/identification and/or a transaction priority, and then send the carrier. The system determines a path to route the carrier and begins directing the carrier through the system. In the illustrated embodiment, each station 16 is interconnected to a transfer unit 20 via single pneumatic tube having an internal bore sized to receive a pneumatic carrier. The transfer unit orders carriers arriving through any of the different tubes connecting the different stations 16a-n into a single pneumatic tube or directs a carrier arriving from the single pneumatic tube into any one of the tubes connected to a desired station. The single pneumatic tube exiting the transfer unit 20 is further in connection with a vacuum bypass transfer unit 22 (i.e., turn around transfer unit) and a blower 24 that provides the driving pneumatic force for carrier movement. A set of transfer units 20, 22 a blower 24 and one or more stations 16 typically define a single zone (e.g., zones A, B, and C). The bypass transfer unit 22 is typically the point of connection to each zone. In further embodiments (not illustrated) the bypass transfer unit may also connect directly to one or more user stations free of an intervening transfer unit 20.

In the illustrated embodiment, each of the zones is directly interconnected to each adjacent zone by an inter-zone (IZ) transfer tube 8. In the presented embodiment, the IZ tubes each include a device for temporarily holding carriers passing between zones. One such device is a traffic control unit (TCU) 14 which is employable to receive, temporarily store and controllably release one or more carriers. Such functionality allows, for example, holding a carrier until a path through a subsequent potion of the system becomes available and/or until a source of pressure or vacuum becomes available. In certain configurations, one or more TCUs 14 may be provided to operate as linear storage devices, e.g., on a first in first out (FIFO) basis.

Figure 2:
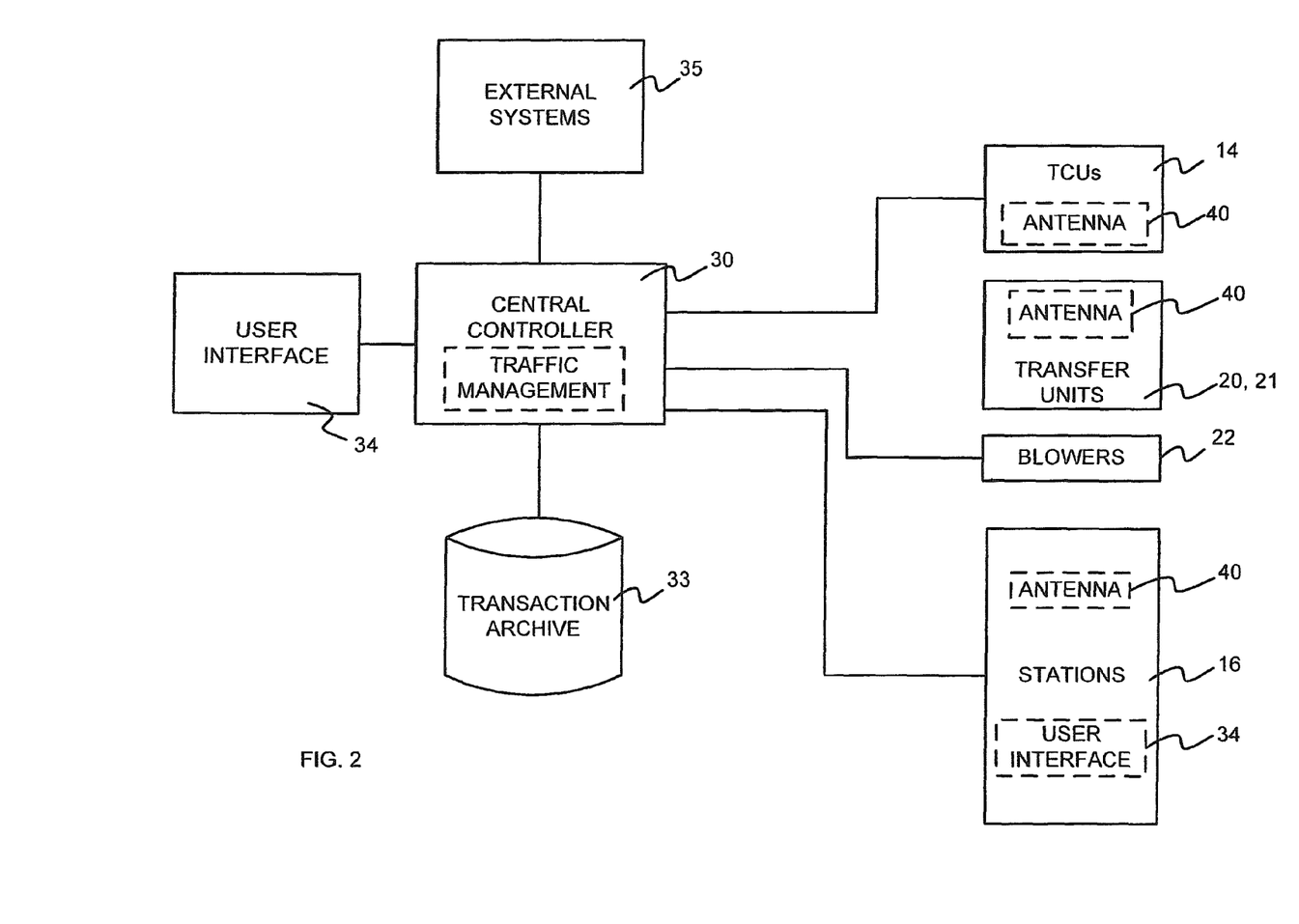
FIG. 2 illustrates a control system for use in controlling a pneumatic tube system.

All of the components described in FIG. 1 electronically connect to a central controller which controls their operation. Disclosed in FIG. 2 is an electrical system diagram for the pneumatic carrier system 10 described herein. Providing centralized control for the entire pneumatic carrier system 10 is a system central controller (SCC) 30. The SCC 30 may include a digital processor and memory. SCC 30 may be configured as one or more programmable digital computers. Connectable to the SCC 30 may be one or more user interfaces 34 through which a system user may monitor the operations of the system and/or manually enter one or more commands to control its operation. Typically, at least one user interface 34 is located at or within an area serviced by stations 16. For example, in a medical facility application, one or more user stations 16 and at least one user interface 34 may be provided within each emergency room, laboratory, nursing station, etc. The user interfaces 34 may be contained in the stations 16 or may be stand-alone units.

Each of the components described above in relation to FIG. 1 may include one or more electrical and/or electro-mechanical components which provide for the physical movement of a carrier within the system 10 and/or the obtainment/provision of information relating to the location of the carriers within the system 10. In this regard, the components shown in FIG. 2 are representations of the various electrical and electro-mechanical systems that may be employed by the pneumatic carrier system 10. Although in FIG. 2 they are represented single blocks, one skilled in the art will realize that the block for each type of device represents the electronics for a number of the same or similar type of components positioned throughout the system which provides for its operation. Further, each of the user stations 16, and TCUs 14 may incorporate antenna devices/readers 40 configured to energize and retrieve identification information from identification devices such as RFID chips that may be incorporated into each of the carriers. Such a system is set forth in co-assigned U.S. Pat. No. 7,243,002, the contents of which are incorporated herein by reference.

Referring again to the electrical system diagram of FIG. 2, it may be seen that various transfer units 20, 22 and blowers 24 are also electrically connectable to the SCC 30. Through these connections, SCC 30 may send command signals to these devices so that they are actuating and operating at particular times and in particular sequences to affect the completion of the various carrier transactions. Other signals exchanged may include various monitoring signals that indicate the devices are operating as desired.

The SCC 30 is further connectable to a transaction archive 33, or database, which is configured to store transaction information/records for carriers moving within the system 10.

The transaction information may include identification information for carriers moving through the system and destination information entered by a system user. Further, the transaction information may include sender identification, recipient identification, security information (e.g., PIN numbers), and/or location information obtained via tracking inputs received from antenna devices/readers 40 located at user stations 16, TCUs 12, or other components along the travel path of a given carrier. The external systems 35 connected may depend on the purpose of the pneumatic carrier system 10. For example, the external systems 35 may include a lab information system, a pharmacy information system, a patient information system, a security information system and/or messaging systems (e.g., email, text, paging, or wireless system, etc.).

System Operation

Referring to zone A of FIG. 1, intra-zone transfer between station 16a and station 16n is described. Initially, a user inserts a carrier into station 16a and requests transfer to station 16n. The system controller operates the blower 24 of zone A to provide vacuum to station 16a. This requires aligning the internal tubing of the bypass transfer unit 22 and the transfer unit 20 to the pneumatic tube connecting station 16a to the transfer unit 20. Once aligned, the blower provides vacuum and the carrier is drawn into the pneumatic tube. The carrier passes through the transfer unit 20 and is received in the by-pass transfer unit 22, which holds the carrier during realignment. That is, the system controller aligns the internal tubing of the transfer unit 20 with the pneumatic tube interconnected to station 16n. The blower 20 then provides pressure to the carrier expelling the carrier out of the bypass transfer unit 22 through the transfer unit 20, into the connecting tube and to station 16n. In this regard, the intra-zone transfer typically allows for applying pressure or vacuum to a given carrier and, thus, such zones are sometimes referred to as PV Zones.

Inter-zone transfer is now discussed in relation to movement of a carrier from station 16a in zone A to a station in zone C. Again, to provide vacuum to station 16a, the system controller aligns the internal tubing of the bypass transfer unit 22 and transfer unit 20 to provide a continuous pneumatic path between station 16a and the transfer unit 22. Accordingly, the vacuum may be applied to these aligned tubes to draw a carrier from station 16a into the bypass transfer unit 22. At this time, internal tubing of transfer unit 22 may be aligned with an IZ tube 8. Once aligned, blower 24 provides positive pressure behind the carrier, which ejects the carrier from the bypass transfer unit 22 and into the IZ tube 8. In the present embodiment, the carrier is received by a TCU 14 in the IZ tube 8 where it awaits acceptance by the by-pass transfer unit of adjacent zone B. Once zone B receives the carrier, the bypass transfer unit is realigned to route the carrier to zone C via the IZ tube interconnecting zone B and zone C. Once the carrier is received in zone C, the by-pass transfer unit and transfer unit of zone C are aligned with a desired station and the blower delivers the carrier to the station.

Such inter-zone transfer typically occur without difficulty. However, when a significant number of carriers are in the system at the same time, the possibility of gridlock arises. Generally, gridlock occurs when two or more carriers are unable to continue moving in the system because of a conflict in the intended paths of each carrier. Typically pneumatic carrier systems can have a maximum number of carriers in transit of approximately 1 carrier per zone plus the number of inter-zone storage lines. The system 10 described in FIG. 1 may have a maximum number of carriers in transit approximately equal to the number of parking spaces (TCU slots) in addition to the pressure/vacuum transactions.

To attempt to resolve gridlock situations some previous systems have included a bypass pipes 26 connected to some or all of the by-pass transfer units in the system. Such by-pass pipes 26 are used as temporary destinations for a transactions that are involved in a gridlock condition. Placing one transaction in a by-pass pipe permits another transaction to move through a zone previously occupied or reserved by the transaction that was placed in the bypass pipe 26. In one embodiment, the bypass pipe 26 includes a vacuum bypass and a pressure relief valve, which allow the carrier associated with a transaction to be moved into and out of the bypass pipe 26.

While effective in some instances, the inventor has recognized that in certain configurations of pneumatic carrier systems, a by-pass pipe may not exist or may be inaccessible at times. In the latter regard, it has been recognized that improved system controls and processing have increased system throughput to the point where the system can become saturated even when a by-pass pipe is present. That is, gridlock or deadlock may occur even after moving a first carrier to a bypass pipe to allow another carrier to pass through a zone. Further, previous gridlock systems relied upon the ability to recall carriers from interzone connections to re-order the carriers (i.e., allow a carrier to pass by another carrier). However, many systems now utilized dedicated unidirectional inter-zone connections. In such systems, some previous methods of alleviating gridlock conditions that require reversing the direction of an inter-zone transaction are not available.

Accordingly, provided herein are systems, apparatus, and methods that allow for alleviating gridlock conditions in instances where a pneumatic system is saturated and/or includes unidirectional inter-zone connections. Aspects of the invention include the recognition that locations within a pressure vacuum zone may be utilized to temporarily park or store carriers. In this regard, such carriers may be removed from a conflicting/gridlock position and temporarily parked (e.g., delivered) to a location within the system. Such temporary removal and temporary delivery of the carrier from its gridlock position generally allows for continued processing/delivery of one or more additional carriers involved in the gridlock.

FIGS. 3A-D illustrate a simplified case of system saturation where either no by-pass pipe is present or such by-pass pipe is occupied. As shown, the present source of a first transaction T1 is a first inter zone inter-zone IZ1 leading into a PV zone. The immediate destination of transaction T1 is inter-zone IZ2 exiting the PV zone. As shown IZ2 is occupied by transaction T2. Likewise, the immediate destination of T2 is inter-zone IZ1, which is occupied by transaction T1. Since the two carriers T1 and T2 cannot physically pass each other going in opposite directions, a gridlock condition exists at the PV zone.

Figure 3A:
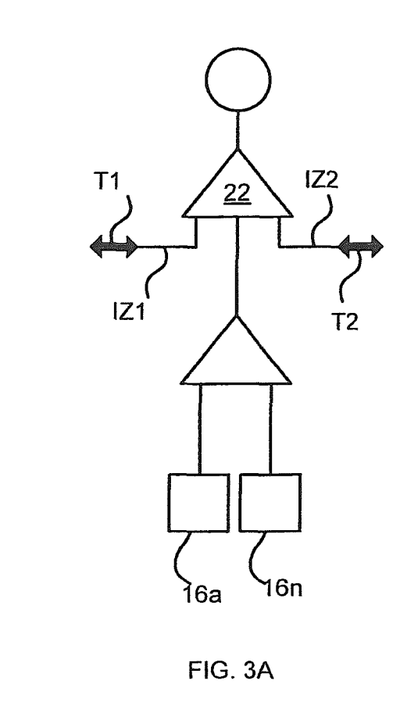
FIGS. 3A-D illustrate alleviation of an opposing gridlock condition.
Figure 3B:
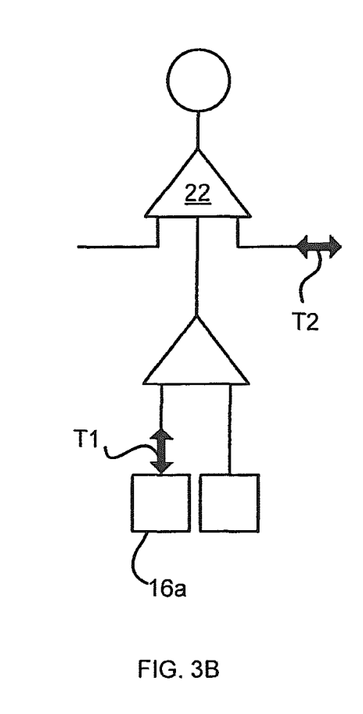

In order to alleviate gridlock in cases where the by-pass pipe is either occupied or absent, the present system and method recognizes that one of the transactions may be temporarily parked above a user station 16 of a PV zone. That is, when a gridlock condition is occurs between two opposing inter-zone transactions one of the transactions may be partially delivered into the intervening zone. For instance, one of the transactions T1 may be received into the by-pass transfer 22 of the PV zone and parked at a location above one of the user stations 16a-16n in the PV zone. This temporarily moves the transaction out of the way of the opposing transaction.

Figures 3C, 3D:
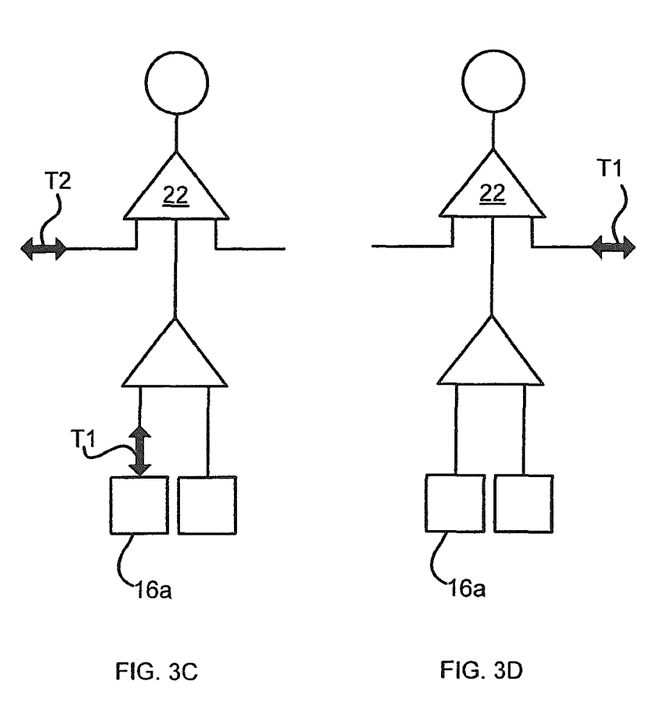

Such temporary delivery to a location above one of the user stations 16-a-n may include at least partially closing a slide plate above the carrier station (e.g., 16a). In this regard, the carrier may be moved to a position above the carrier station but not actually delivered into the carrier station. See FIG. 3B. In this arrangement, the carrier is available for automated retrieval from the user station 16a. That is, no system user is required to re-load the carrier into the user station as would be the case if the carrier dropped into a receiving bin of the user station. In addition, it may be desirable to temporarily disable the user station to prevent interruption of this 'station by-pass' procedure. It will be appreciated that the different user stations of a given PV zone may be located at different distances from the bypass transfer unit. Accordingly, it may also be desirable to select a station for use as a by-pass location (e.g., resolver) that is located nearest to the bypass transfer unit in order to reduce transfer times. However, this is not a requirement. Once the carrier is parked above the user station, the other transaction T2 may be received by the bypass transfer unit 22 and transferred to IZ1. See FIG. 3C. Accordingly, after the second transaction T2 has moved through the PV zone, the system may retrieve (e.g., under vacuum) the parked transaction T1 from above the user station and deliver the carrier to IZ2. See. FIG. 3D.

Figure 4:
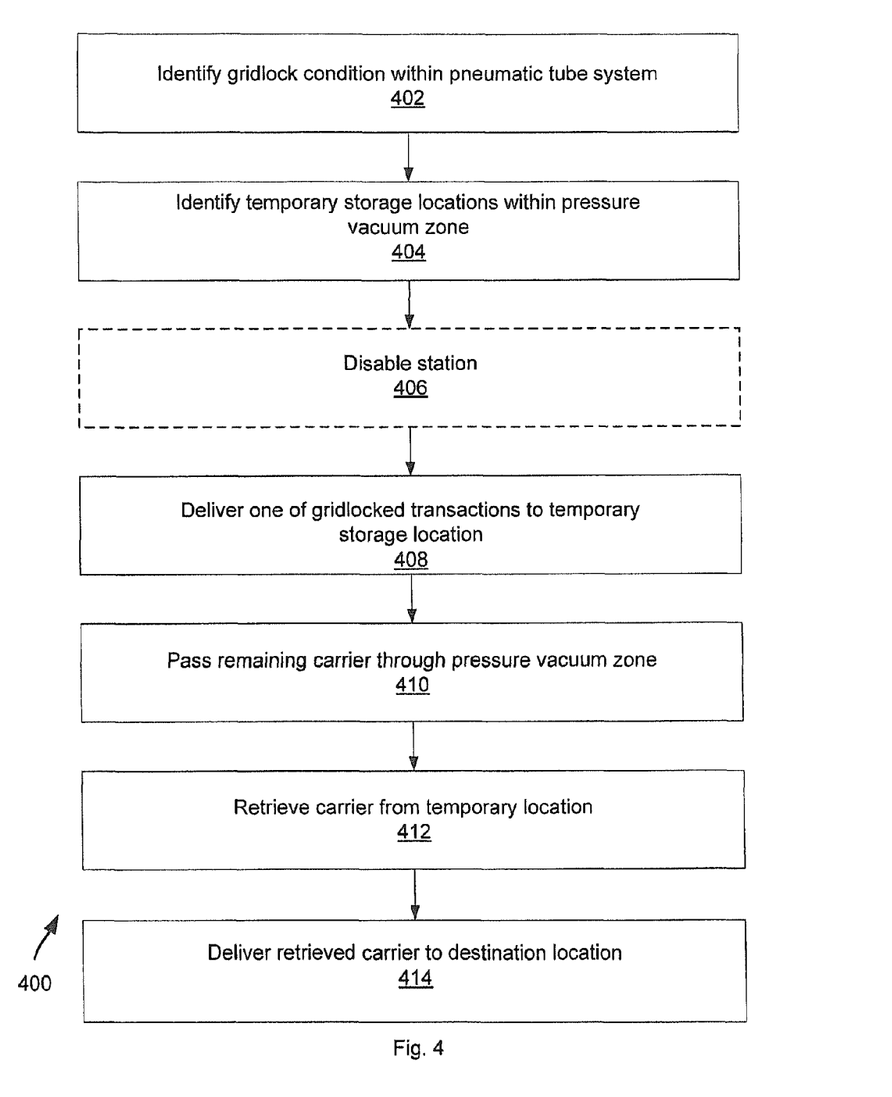
FIG. 4 illustrates a process for alleviation of an opposing gridlock condition.

This process (400) is illustrated in FIG. 4. Initially, a gridlock condition is identified (402) between first and second carriers passing through a pressure vacuum zone. After identifying the gridlock condition, stations associated with the pressure vacuum zone are identified (404) for use in resolving the gridlock condition. Such identification may include determining a travel distance from the bypass transfer unit that the station(s) as well availability of the station(s). Once a station is selected, the station may be disabled (406) to prevent interference with the station by-pass procedure. Once disabled, one of the gridlocked transactions is delivered (408) to a location above the station. For instance, the transacionnt may be parked at a slide plate above the station or the carrier may be left within in a pneumatic tube anywhere within the PV zone. This is the relieving transaction. The opposing transaction is then delivered (410) through the PV zone to the now vacated interzone connection. Once the opposing transaction passes through the PV zone, the carrier of the relieving transaction is retrieved (412) from the location above the user station. Accordingly, the retrieved carrier may then be launched into the IZ tube vacated by the opposing transaction. Each transaction then proceeds (414) toward its ultimate destination.

Effectively, this process inserts a delivery and retrieval cycle into the transaction of T1. If the process of FIG. 4 were occurring in the system of FIG. 1, the route list or transaction record for T1 prior to diversion would be:

$ST^a \rightarrow PV^a \rightarrow IZ1$
$IZ1 \rightarrow PV^b \rightarrow IZ2$
$IZ2 \rightarrow PV^c \rightarrow ST^c$ That is, in this example the carrier associated with T1 originates from a user station in zone A and arrives at the by-pass transfer unit of zone A (i.e., $PV^a$), which launches the carrier to zone B via the IZ connection there between. To complete its delivery to a station in zone C, the carrier must pass through zone B (i.e., $PV^b$) into the IZ between zone B and C (i.e., IZ2) and into zone C ($PV^c$) from where the carrier is delivered to a station in zone C (i.e., $ST^c$). However, if there is an opposing transaction in IZ2 between zones B and C, T1 may be diverted to a temporary location above a station in Zone B. Accordingly, additional routing is inserted into the route list of T1:

$ST^a \rightarrow PV^a \rightarrow IZ1$
$IZ1 \rightarrow PV^b \rightarrow ST^b$
$ST^b \rightarrow PV^b \rightarrow IZ2$
$IZ2 \rightarrow PV^c \rightarrow ST^c$ As shown, the rout list is modified to include the diversion to a station ($ST^b$) in zone B.

Figure 5A:
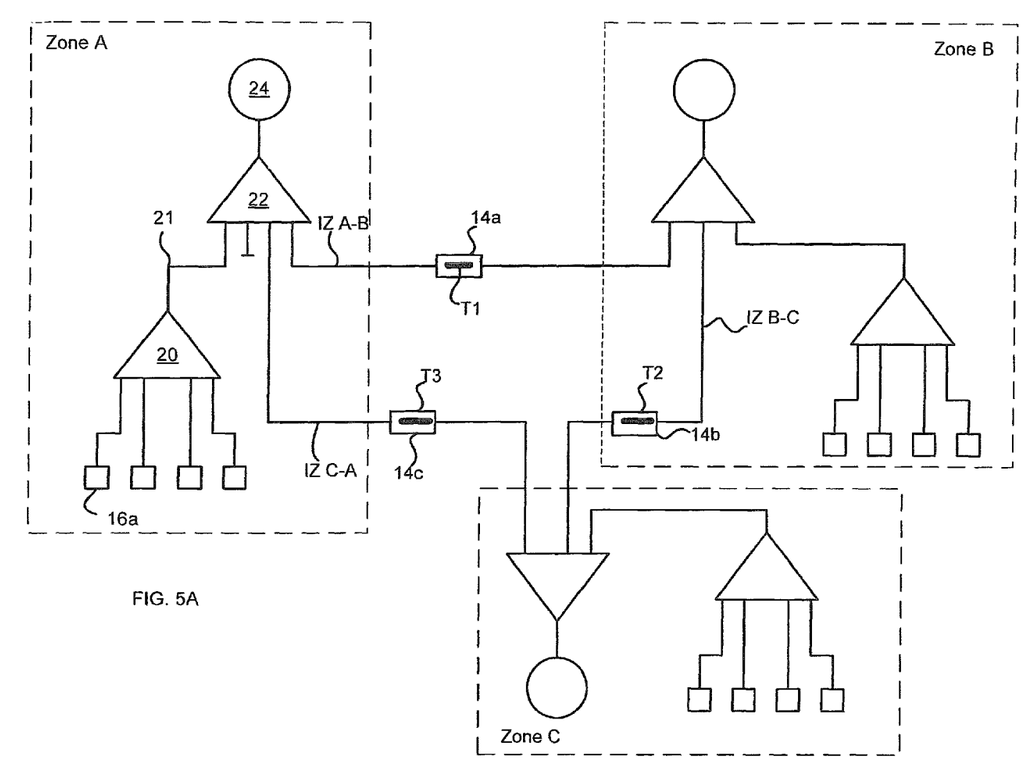
FIGS. 5A-5C illustrate alleviation of a circular gridlock condition.
Figure 5B:
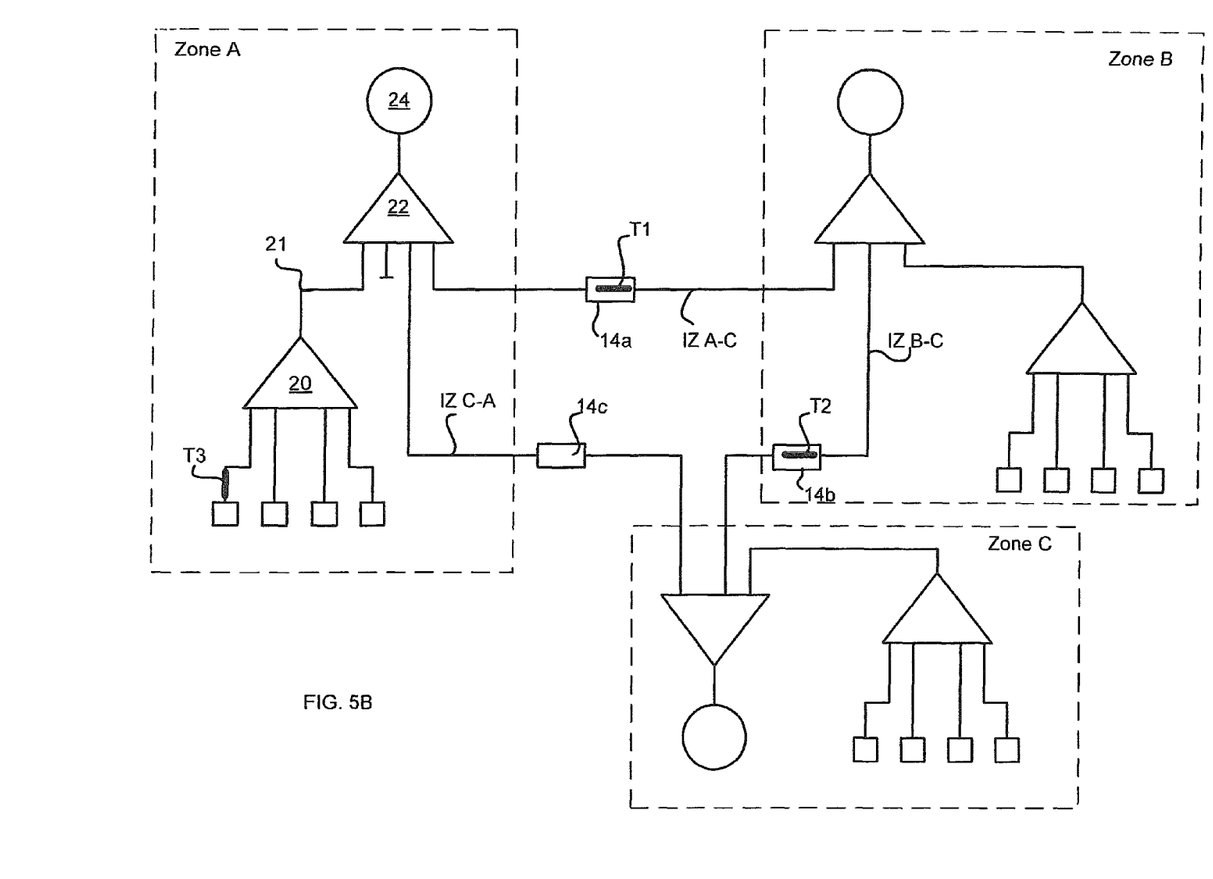
Figure 5C:
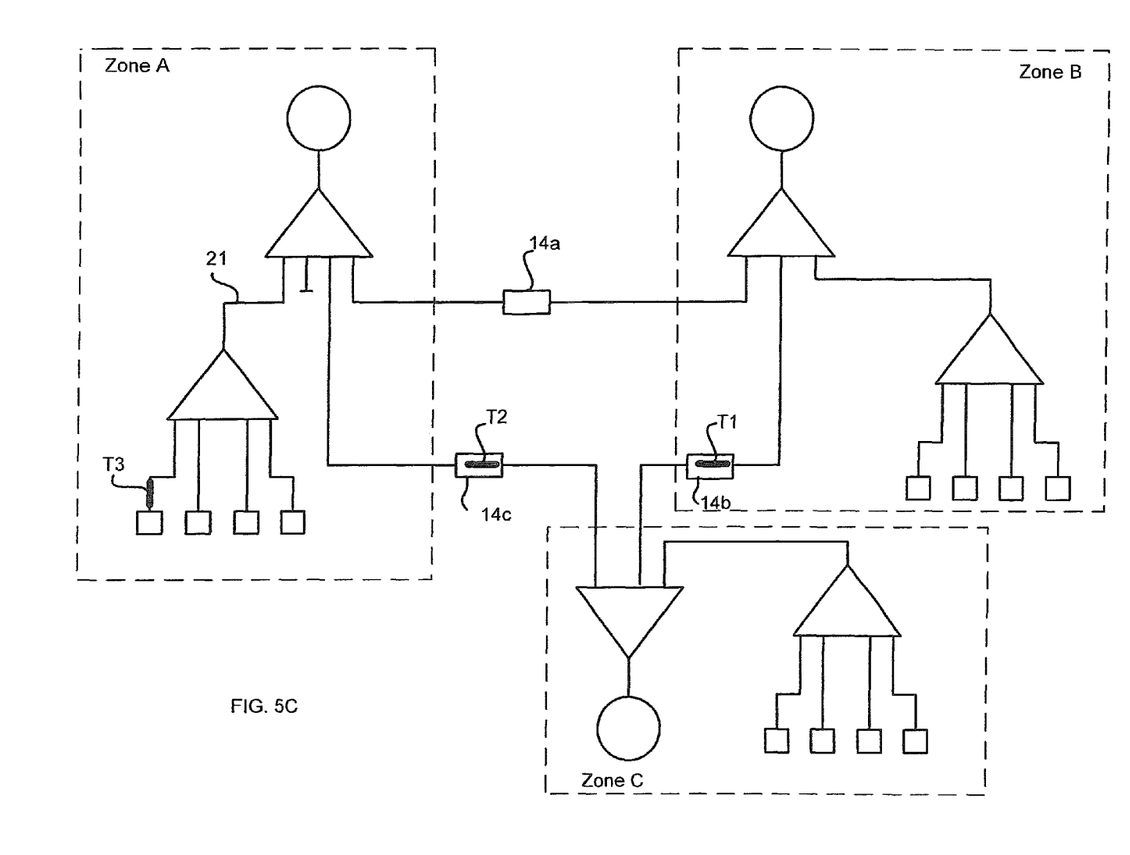
Figure 6:
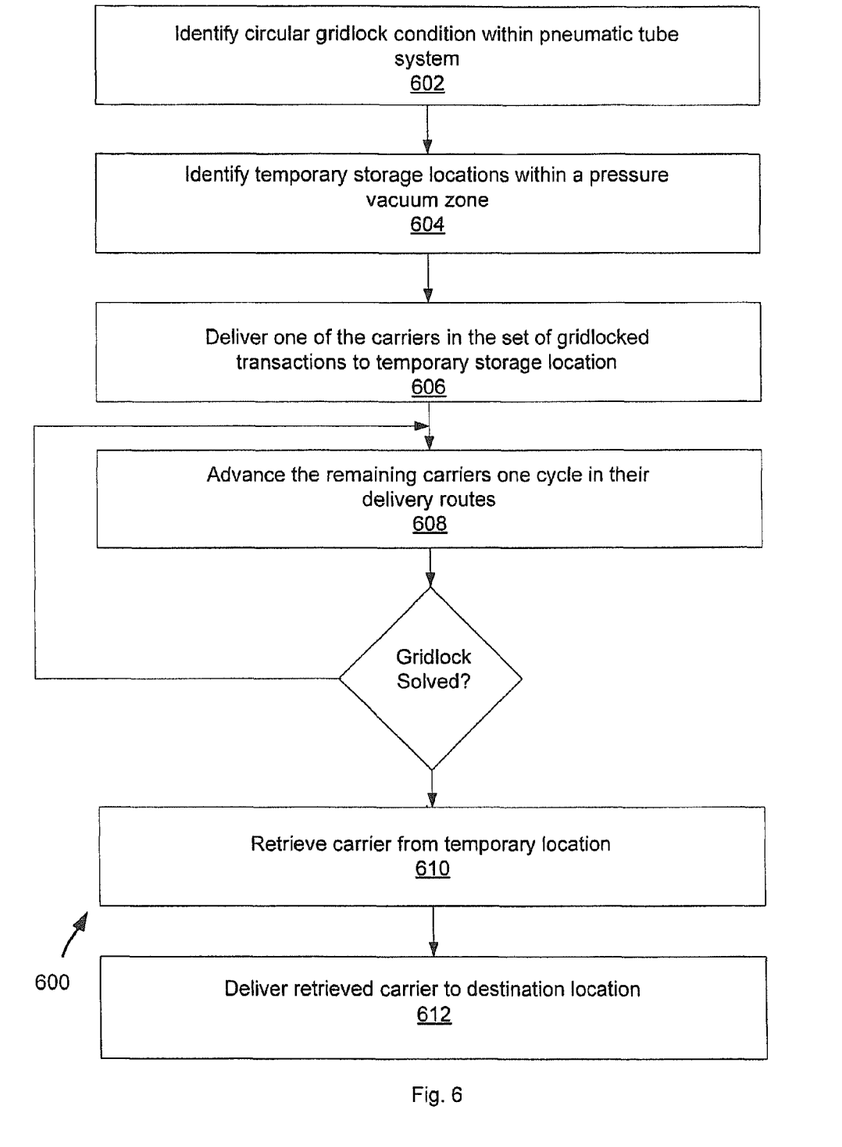
FIG. 6 illustrates a process for alleviation of a circular gridlock condition.

In addition to opposing gridlock, where at least one pair of transactions is prevented from proceeding in directly opposing paths through a zone, gridlock may also occur when blocking transactions are not routed on opposing paths. An example of system gridlock, or circular gridlock, is illustrated in FIGS. 5A-C. As shown, zones A, B, and C are connected by interzones IZA-B, IZB-C, and IZC-A. Transaction T1 presently occupies interzone IZA-B and has an immediate destination of interzone IZB-C, which is occupied by transaction T2. Transaction T2 has an immediate destination of interzone IZC-A, which is occupied by transaction T3. Transaction T3 has an immediate destination of interzone IZA-B, which is occupied by transaction T1. Since the immediate destination of each of the transactions is occupied by another transaction that is unable to proceed, a circular gridlock condition exists.

Such a gridlock condition may be identified using a recursive search that is initiated when a selected transaction is unable to move forward. The reason for the inability to move forward is identified by querying the status of the immediate destination. If the reason that the selected transaction is unable to move forward is due to an occupying transaction in the immediate destination interzone, the status of the immediate destination interzone of the occupying transaction is queried to determine the reason for its presence. If the occupying transaction is similarly unable to move forward due to the presence of a transaction in the occupying transaction's immediate destination interzone, a gridlock condition may exist. In order to identify all of the transactions in the group of transactions involved in the gridlock, the process of querying the next immediate destination for status is repeated for each subsequent occupying transaction, until either the occupying transaction is found to be the initially selected transaction or all of the transactions have been identified. In the former regard where the initially selected transaction is a blocking transaction in a set of transactions including three or more transactions, a circular gridlock exists.

In the arrangement of FIG. 5A, each of the interzone transfer units 14a-14c is occupied by a carrier that is destined for the subsequent interzone. It will be appreciated that FIGS. 5A-C represents a simplified pneumatic system. Furthermore, it will be appreciated that the various zones may be interconnected to additional zones and that these figures illustrate a non-limiting example of a circular gridlock condition where movement of a set of three or more carriers (i.e., a gridlock set) is interdependent on movement of one other carrier in the set. In this arrangement, the interzone transfer control units 14a-14c are each one-way devices. Accordingly, it is not possible to withdraw a carrier from an interzone location in order to allow another carrier past that carrier.

A process (600) for relieving a circular gridlock condition is set forth in FIGS. 5A-C and FIG. 6. Upon identifying (602) a circular gridlock condition exists, a controller is operative to identify a temporary storage locations (604) in PV Zone involved in the circular gridlock. The controller generates signals that remove one of the carriers from the gridlock set of carriers and then sequentially advances each of the remaining carriers in the to attempt to alleviate the gridlock condition. In one arrangement, the carrier that is removed from the circular gridlock is parked to a temporary storage location (606) above a user station or within a pneumatic tube in a manner similar to that discussed above in relation to FIG. 3. For instance, referring to FIG. 5B, the carrier of transaction T3 may be moved from TCU 14C to the by-pass transfer unit 22 of zone A. While not being able to advance to the next interzone IZA-C, the by-pass transfer unit 22 can deliver the carrier T3 to any one of the potential plurality of user stations within zone A or to any pneumatic tube within Zone A including the pneumatic tube 21 interconnecting the by-pass transfer unit 22 to the transfer unit 20. That is, the system may temporarily strand the carrier within a pneumatic tube. However, in the present embodiment, it may be desirable to determine that no other carriers in the circular gridlock set are destined for the parking station or a tube in which a carrier is temporarily stranded. That is, the transaction records of all of the identified gridlock set may be identified to determine final destination locations for each of the carriers. Accordingly, if any of the carriers in the circular gridlock set are destined for a station in zone A, another station or tube may be selected. Alternatively, if no other stations are available (e.g., zone A includes only a single station or all stations in zone A are otherwise occupied) another one of the transaction (e.g., T1 or T2) and one of the other zones (e.g., zone B or zone C) may be selected to provide a relieving transaction. In the present embodiment, after determining that none of the set of circular gridlock carriers T1-T3 is destined for station 16a, the carrier associated with T3 may be removed from IZC-A and delivered (606) to a slide plate above station 16a for subsequent retrieval. At this time, at least one spot within the TCU 14c of IZC-A is open. Accordingly, the remaining carrier transactions of the gridlock set (T1 and T2) may advance (608) one step in their delivery cycles. That is, T2 may advance through Zone C to the TCU 14C in IZC-A. Likewise, once T2 vacates IZB-C, transaction T1 may advance from IZA-B through Zone B and into IZB-C. See FIG. 5C. It will be further appreciated that if additional carriers were involved in a larger circular gridlock, each carrier within the circular gridlock may be sequentially advanced into the recently vacated IZ zone. The cyclic or sequential advancement of the carriers is based on the recognition that simply by-passing a first transaction by a second transaction often results in the advanced second transaction being immediately gridlocked (i.e., repeat gridlock) by a transaction that was blocking the first transaction. Cyclical advancement alleviates such repeat gridlock. Stated otherwise, the cyclic advancement provides downstream openings for an advanced transaction, which tends to reduce or eliminate repeat gridlock.

To ensure that the zones stay vacant during the sequential operation, the system and method may further include disabling a portion or the remainder of the pneumatic system to prevent entry of additional transactions and their associated carriers into the area of the circular gridlock during gridlock alleviation. Once all the carriers have advanced (608) at least one cycle, the relieving carrier delivered to the location above user station 16a may be retrieved (610) and delivered (612) to its destination location TCU 14A in IZA-B. However, it will be further appreciated that prior to retrieval of the relieving transaction T3, a gridlock detection procedure may be performed for one or more of the sequentially advanced carriers. Accordingly, prior to returning T3 to the system for continued delivery, it may be determined if returning the carrier would result in further gridlock. Accordingly, if further gridlock would occur, the remaining carriers may be further advanced another step in their delivery cycles to attempt to relieve the gridlock. In this regard, one or more of the remaining carriers may be transferred to another zone (not illustrated) or delivered to a station and thereby removed from consideration. For instance, transaction T1 that has advanced to IZB-C may be destined for delivery to a station within Zone C and may be removed from the circular gridlock set. Accordingly, at this time, circular gridlock may be determined to have been alleviated, and transaction T3 may be returned to service, and the system may be reinitiated to allow full use including accepting new transactions through the area associated with the circular gridlock.

While discussed primarily in relation to use of user stations as a resolver for temporarily diverting and storing a transaction, it will be appreciated that other system locations may be utilized. What is important is that the PV Zone that is used to temporarily re-route a carrier transaction is operative to send and retrieve the carrier. As long as this functionality is available, the PV Zone may deliver the carrier to any component within such a zone including routing components and/or pneumatic tubes.

The foregoing description of the presented inventions has been presented for purposes of illustration and description. Furthermore, the description is not intended to limit the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such or other embodiments and with various modifications required by the particular application(s) or use(s) of the presented inventions. It is intended that the appended claims be construed to include alternative embodiments to the extent permitted by the prior art.

What is claimed:

1. A method for use in a pneumatic carrier system where the pneumatic carrier system includes a plurality of zones interconnected via inter-zone pneumatic tubes and wherein each zone includes one or more user stations, pneumatic tubes, and an air source for moving carriers to and from said stations via said pneumatic tubes, comprising the steps of:
using a pneumatic system controller, identifying a set of at least three inter-dependent carrier transactions for a set of carriers including at least first, second and third carriers, wherein at least first second and third immediate destination locations for said set of at least first, second and third carriers, respectively, are currently occupied by another carrier of said set of carriers;
generating control signals at said system controller operative to:
temporarily deliver said first carrier of said set of carriers to a temporary location above a user station in said pneumatic tube system, wherein said first carrier vacates said second immediate destination location for said second carrier of said set of carriers;
move said second carrier to said second immediate destination location vacated by the first carrier, wherein moving the second carrier vacates said third immediate destination location for said third carrier of said set of carriers;
move said third carrier to said third immediate destination location vacated by said second carrier; and
once said second immediate destination location is vacated, retrieve said first carrier from said temporary location above said user station and deliver said first carrier to said first immediate destination location.

2. The method of claim 1, further comprising:
selecting one of said set of carriers for delivery to a user station, wherein a user station selected for delivery does not correspond to a final destination location for any of said set of carrier transactions.

3. The method of claim 1, further comprising:
upon identifying said set of interdependent carrier transactions, disabling at least a portion of user stations of said pneumatic tube system to prevent entry of additional transactions into an area of the pneumatic system including the interdependent carrier transactions.

4. The method of claim 1, wherein temporarily delivering said carrier comprises:
generating control signals to lock said station to prevent use of said station while said carrier is temporarily stored above said station.

5. The method of claim 4, further comprising:
generating control signals to move a slide plate to a partially opened position above said station, wherein said partially opened slide plate permits air to pass through said slide plate to allow pressure or vacuum to be applied to said first carrier.

6. The method of claim 1, further comprising:
sequentially moving each subsequent carrier of said set of carriers, to an immediate destination location vacated by a preceding carrier.

7. The method of claim 1, wherein at least a portion of said set of carriers is located in unidirectional pneumatic system components.

8. The method of claim 1, wherein identifying a set of interdependent carrier transactions comprises:
determining said first immediate destination location of said first carrier is currently occupied by said third carrier and said third immediate destination location of said third carrier is occupied by said second carrier, and wherein a second immediate destination location of said second carrier or a subsequent carrier blocking passage of said second carrier is a current location of the first carrier.

* * * * *